(12) United States Patent
Larson et al.

(10) Patent No.: US 10,553,137 B2
(45) Date of Patent: Feb. 4, 2020

(54) VISUAL DISPLAY HAVING ADJUSTABLE DIFFUSION STRENGTH

(71) Applicant: Plantronics, Inc., Santa Cruz, CA (US)

(72) Inventors: Jeffrey Michael Larson, Santa Cruz, CA (US); Jeremy Jacob D'Ambrosio, Soquel, CA (US); Jiefu Guo, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 37 days.

(21) Appl. No.: 15/901,794

(22) Filed: Feb. 21, 2018

(65) Prior Publication Data
US 2019/0259316 A1      Aug. 22, 2019

(51) Int. Cl.
*G09G 3/00* (2006.01)
*G02B 26/02* (2006.01)
*G09G 3/32* (2016.01)
*H04N 13/32* (2018.01)

(52) U.S. Cl.
CPC .......... *G09G 3/003* (2013.01); *G02B 26/023* (2013.01); *G09G 3/32* (2013.01); *H04N 13/32* (2018.05); *G09G 2320/0626* (2013.01); *G09G 2320/0666* (2013.01)

(58) Field of Classification Search
CPC .. G09G 3/003; G09G 3/32; G09G 2320/0666; G09G 2320/0626; H04N 13/32; G02B 26/023
See application file for complete search history.

(56) References Cited

U.S. PATENT DOCUMENTS

| 8,390,824 B1 * | 3/2013 | Spitz ................. G01B 11/2513 356/616 |
| 2008/0219001 A1 * | 9/2008 | Russell ................... F21V 3/02 362/246 |
| 2010/0071238 A1 | 3/2010 | Guo |

(Continued)

FOREIGN PATENT DOCUMENTS

| CN | 102116938 A | 7/2011 |
| WO | WO 2010/026389 A1 | 3/2010 |

OTHER PUBLICATIONS

Campbell, "Portfolio: Low Resolution Works: Ambiguous Icon 2 Fight," found at URL <http://www.jimcampbell.tv/portfolio/low_resolution_works/ambiguous_icon_2_fight/> on Aug. 8, 2017, 1 page.

(Continued)

*Primary Examiner* — Premal R Patel
(74) *Attorney, Agent, or Firm* — Haynes Beffel & Wolfeld, LLP

(57) ABSTRACT

A display apparatus uses an LED array having an LED pixel pitch, having LED pixels emitting light with viewing angles θ. A transmissive diffuser panel is mounted with the LED array, having a directly-lit, diffuser panel surface spaced away from the LED array by an adjustable distance D. The distance D and the viewing angles θ being are effective to merge illumination from multiple LED pixels in the LED array on the directly-lit diffuser panel surface. A controller is connected to the LED array having circuitry to control the LED array in response to image data to induce display via the diffuser panel of a time varying image with spatially varying colors and intensities.

20 Claims, 12 Drawing Sheets

(56) References Cited

U.S. PATENT DOCUMENTS

2014/0036503 A1* 2/2014 Olsen .................. F21S 8/026
   362/249.02
2016/0284279 A1* 9/2016 Li ...................... G09G 3/3406

OTHER PUBLICATIONS

Campbell, "Portfolio: Low Resolution Works: Tourists at World Trade Center," found at URL <http://www.jimcampbell.tv/portfolio/low_resolution_works/tourists_at_world_trade_center/> on Aug. 8, 2017, 1 page.

Unknown, "P8mm Soft LED Display Module, P8mm Flexible LED Display Panel," LED Control Card.com Catalog, found at URL <http://www.ledcontrolcard.com/creative-led-module-c-54/p8mm-sof-led-display-modulep8mm-flexible-led-display-panel-p-589.html> on Dec. 29, 2017, 8 pages.

Unknown, "Latest Indoor P10mm 1/8Scan 32x16dots 320mmx160mm LED Module," LED Control Card.com Catalog, found at URL <http://www.ledcontrolcard.com/indoor-led-module-c-48/latest-indoor-p10mm-18scan-32×16dots-320mm×160mm-led-module-p-559.html> on Dec. 29, 2017, 5 pages.

Unknown, "Huidu HD C30 Asynchronous Full Color LED Control Card," LED Control Card.com Catalog, found at URL <http://www.ledcontrolcard.com//huidu-led-card-c-53/huidu-hd-c30-asynchronous-full-color-led-control-card-p-598.html> on Dec. 29, 2017, 4 pages.

Unknown, "Habitat Soundscaping—Human+Nature," Plantornics, Inc. Habitat Brochure, found at URL <https://habitat.plantronics.com/wp-content/uploads/2018/08/Habitat-Soundscaping-Brochure.pdf>, 2017, 4 pages.

Unknown, Indoor Cylinder LED Display, P4mm Column Circular LED Panel, LINSN Technology LED Catalog, found at URL <http://linsnled.com/product/p4mm-cylinder-indoor-led.html>, 2017, 4 pages.

Ang, "Predicting Scatter of Light Shaping Diffuser® Angles Using Luminit's Proprietary Optical Model and OpticStudio," found at URL <https://www.led-professional.com/resources-1/white-papers/downloads/predicting-scatter-of-light-shaping-diffuser-r-angles-using-luminit2019s-proprietary-optical-model-and-opticstudio/at_download/file> on Dec. 20, 2017, 9 pages.

Unknown, "Optical Diffuser Technologies," RPC Photonics, found at URL <https://www.rpcphotonics.com/pdfs/Optical_Diffuser_Technologies_Final_030215.pdf> on Dec. 20, 2017, 4 pages.

Unknown, "Surface Mount LED package," Liteon Optoelectronics, Liteon Technology Corporation, found at URL <http://optoelectronics.liteon.com/en-global/Led/index/FileDownload/7>, 2017, 18 pages.

Parsons, "Colour Theory: Brian Eno reflects on light and listening in his new tome," found at URL <https://www.wallpaper.com/art/brian-eno-light-music-book>, Mar. 23, 2017, 6 pages.

Unknown, "Lighting & Light Management," Curbell Plastics, found at URL <https://www.curbellplastics.com/Research-Solutions/Industy-Solutions/Markets/Lighting> on Jan. 2, 2018, 6 pages.

Unknown, "Light Diffuser Sheet," Excelite Catalog, found at URL <www.exceliteplas.com/product/light-diffuser-sheet> on Jan. 2, 2018, 4 pages.

Unknown, "LED Diffusers—Shaping the Performance of Diffusers," found at URL <https://www.plastics.covestro.com/en/Applications/Lighting-LED/Diffusers.aspx>, last updated Nov. 9, 2017, 3 pages.

Hosfeltgallery, "Jim Campbell Wave Modulation Variation II," Jun. 27, 2008, retrieved from <https://youtu.be/8NgSyE3--jM>.

* cited by examiner

250

FIG. 17A
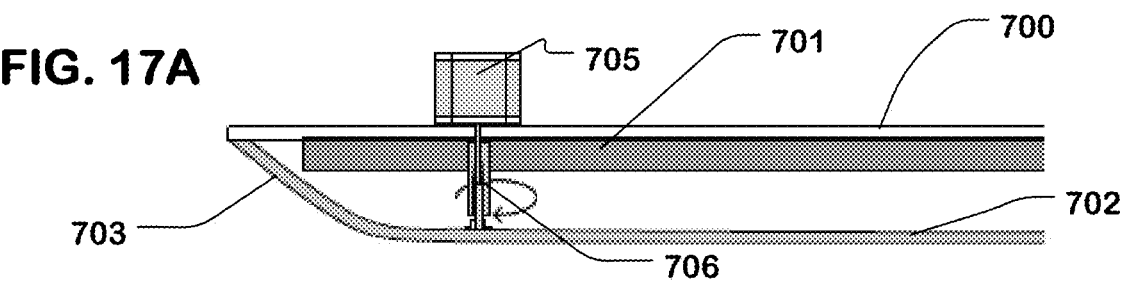
FIG. 17B
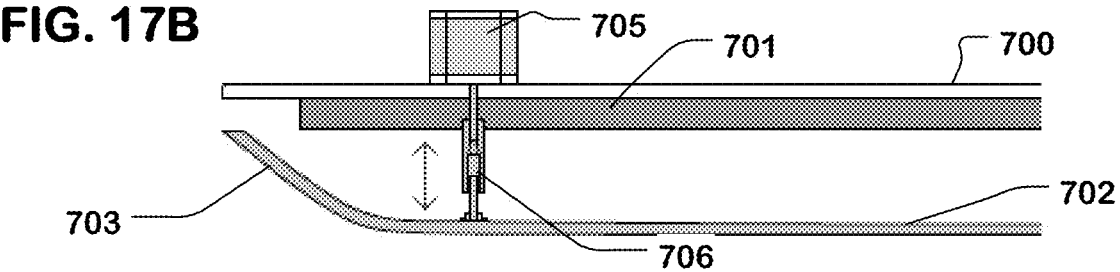
FIG. 18A
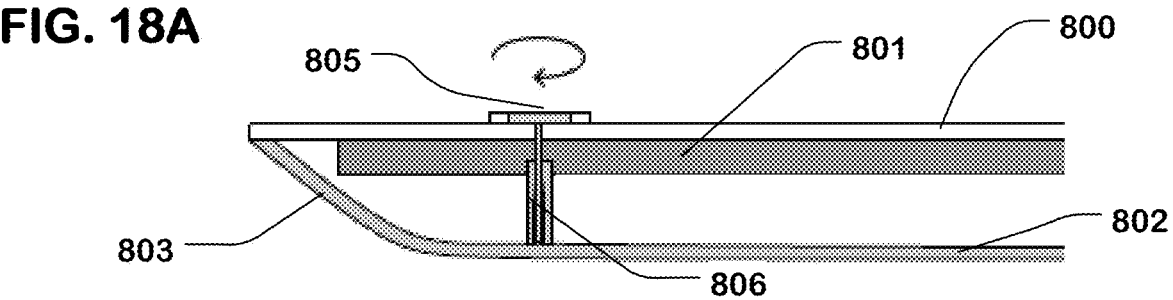
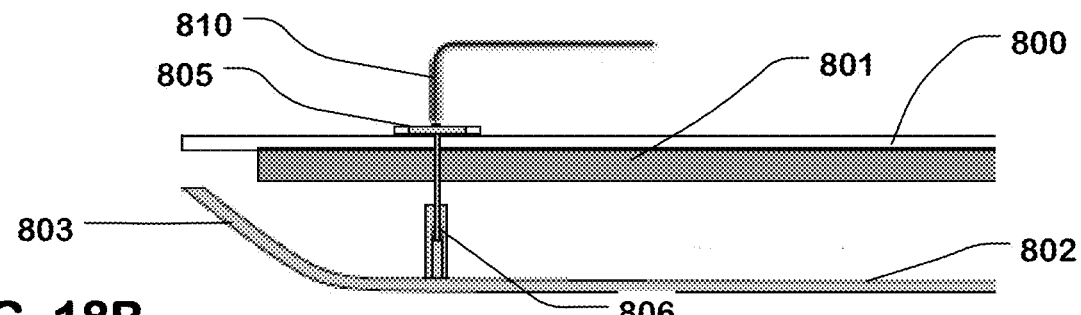
FIG. 18B

VISUAL DISPLAY HAVING ADJUSTABLE DIFFUSION STRENGTH

BACKGROUND

Field

The present invention relates to visual displays having diffusers, including direct lit diffusers illuminated using light sources such as LED arrays.

Description of Related Art

Open office environments are used in many businesses, where they can promote collaboration among workers while making efficient utilization of office space. A problem associated with open office environments relates to distraction that can be caused by activity of coworkers in the space.

Technologies have been developed to reduce distraction by, for example, projecting sounds, such as so-called white or pink noise, into the environment that mask distracting sounds. However, noise masking techniques can become uncomfortable to workers in the space over time as they become aware of, or affected by, the masking sounds. Natural or biophilic sounds have been used in order to reduce the discomfort generated by white or pink noise. However, over time even natural sounds can become less effective in a soundscape environment.

Visual elements have been added to soundscape environments that can contribute to a sense of natural surroundings in an open office environment, in coordination with natural sounds. For example, high definition displays have been used to display water features or other natural scenes to serve as a visual justification for the presence of the sound. Such displays however create high definition images on a flat and shapeless form. Furthermore these devices are expensive. Also, completely defined, high definition visuals can create a distraction because they are not able to blend in with a viewer's surrounding environment, and they are not able to actively be altered without noticeable and unrealistic cuts or edits/loops. Also such displays have restrictive viewing angles and are cumbersome to mount in areas where a viewer could arrive with multiple angles of approach.

It is desirable therefore to provide technologies to improve the soundscape technology that can mask distractions in open office environments.

SUMMARY

For the sole purposes of introduction of the description herein, a summary is provided in this section.

A display technology is provided based on the use of a light source, such as an array of LED pixels, a directly-lit transmissive diffuser panel, and an adjustable support member which secures the diffuser panel in position relative to the light source, so that a region on the diffuser panel surface is spaced away from the light source by an adjustable distance. A controller can provide image data to the light source to produce tuned, diffused images that can have varying effects that can be modified by variations in the adjustable distance. The resulting diffused, time varying images can be both distinguishable and interpretable by a viewer, and modified or controlled by the presenter for different visual and aesthetic effects. In some embodiments, the images can be utilized for ambient lighting, where the images may not be suggestive or interpretable by the viewer. Embodiments of 3D displays as described herein allow for dynamic changes to the time varying images, such as colors and temperatures which vary over time producing visuals without distracting or noticeable edits in the ongoing time varying image.

Also, a feature is described in which the diffuser panel surface includes a plurality of regions, spaced away by adjustable distances from the light source, where the adjustable distances can be the same or different for different regions. Embodiments of the technology can include a controller and a motor, which cause one or more of the adjustable distances to vary over time.

A display apparatus is described that comprises a light source based on an LED array, LED pixels in the LED array emitting light with viewing angles θ. A transmissive diffuser panel is mounted with the LED array, having a directly-lit diffuser panel surface having a region spaced away from the LED array by an adjustable distance D. An adjustable support member connected to the frame of the display apparatus secures the diffuser panel in position relative to the light source. The distance D can be adjusted, so that in combination with the viewing angles θ, the distance D is effective to merge illumination from multiple LED pixels in the LED array on the directly-lit diffuser panel surface. A controller is connected to the LED array having circuitry to control the LED array in response to image data to induce display via the diffuser panel of a time varying image with spatially varying colors and intensities.

In embodiments described herein, the diffuser panel can be non-planar over one or more regions of the panel. Also, embodiments are described in which at least a portion of the directly-lit, non-planar diffuser panel surface establishes lateral viewing angles when the apparatus is disposed as a ceiling mounted fixture, improving the experience for many angles of approach by a viewer. In other embodiments, the display can be mounted on a wall mount fixture.

In combination, the lateral viewing angles and the formation of diffused images on a directly-lit diffuser panel surface create a three-dimensional effect arising from variations in colors and intensities in the diffused image, and the directly-lit regions on the surface of the diffuser panel.

Other aspects and advantages of the present technology can be seen on review of the drawings, the detailed description and the claims, which follow.

BRIEF DESCRIPTION OF THE DRAWINGS

FIGS. 17A and 17B illustrate a first embodiment of an adjustable support member for a display like that shown in FIG. 11.

FIGS. 18A and 18B illustrate a second embodiment of an adjustable support member for a display like that shown in FIG. 11.

DETAILED DESCRIPTION

A detailed description of embodiments of the present invention is provided with reference to the FIGS. 1-20.

Figure 1:
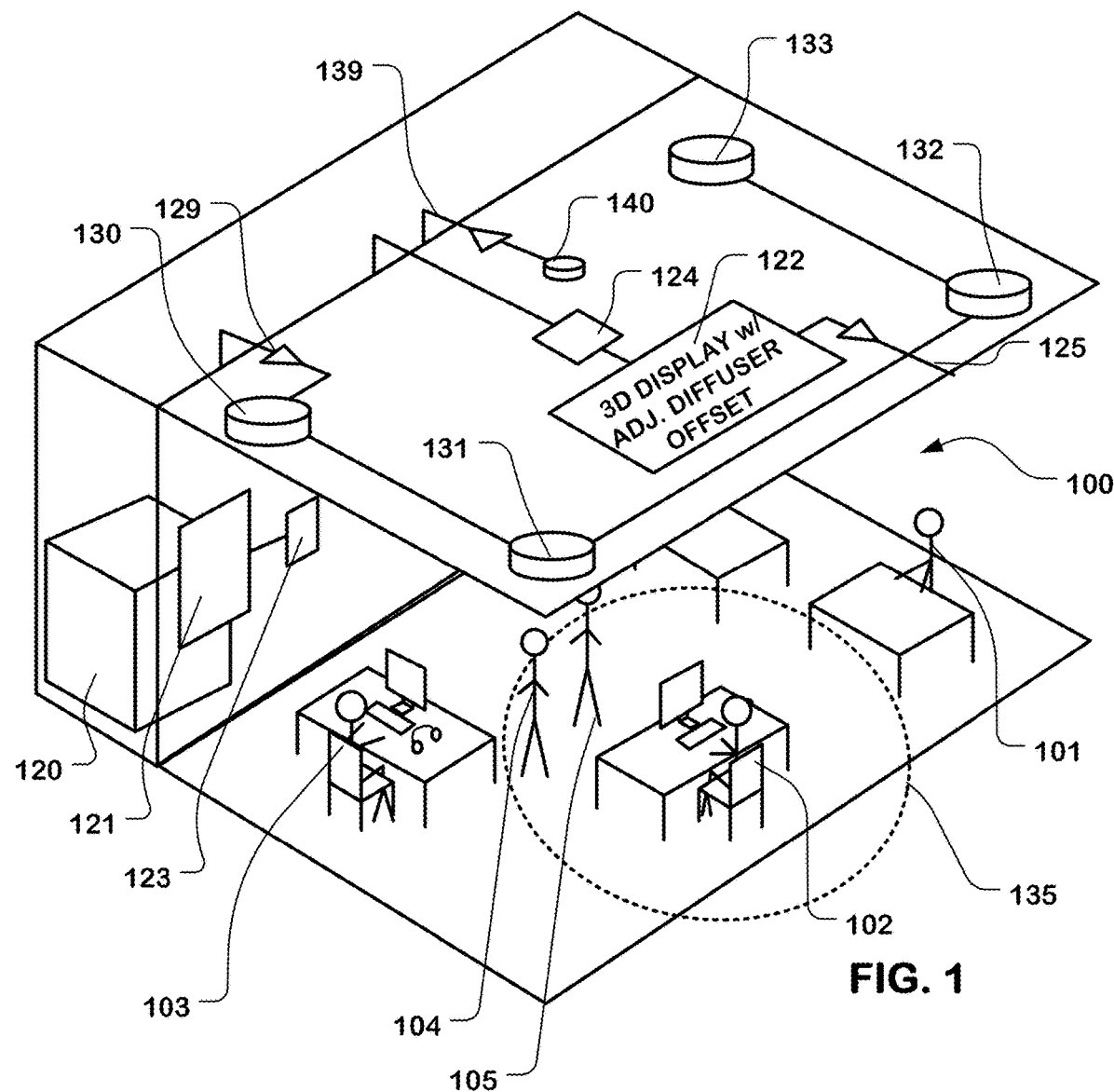
FIG. 1 is a simplified diagram of a soundscape system including a 3D display as described herein.

FIG. 1 illustrates an example of a soundscape system deployed in an open office environment. The open office environment includes workspace 100 in which a number of individuals 101, 102, 103, 104, 105 are present.

The soundscape system includes a computer system 120 which can execute soundscape server programs in this example which manage operation of the components of the soundscape system. In other examples, computer system 120 can be an on-premises network node, and include a communication link to a remote network node which executes soundscape management services, by which the soundscape is coordinated using cloud-based soundscape server programs accessed for example via the Internet.

As illustrated in FIG. 1, a zone of intelligibility 135 surrounds each of the individuals in the open office environment workspace 100. For example, if the individuals 104 and 105 are having a conversation, then that conversation could distract the individual 102. The soundscape system is configured to reduce the zone of intelligibility.

A plurality of speakers 130, 131, 132, 133 arrayed around the workspace 100, in the ceiling in this example, is used to generate a soundscape sound. An audio driver 129 drives the soundscape tracks to produce the sound provided by the soundscape server via the computer system 120. The sound can comprise biophilic or natural sounds, such as flowing water and a gentle breeze through leaves.

The system includes ceiling mounted 3D display 122, having a diffuser panel with an adjustable offset from the light source of the display, which plays video content provided by a video player 124, which is in turn coupled to the computer system 120. The 3D display 122 can be coupled to a source of image data that causes generation of an interpretable time varying image suggestive of a source of the sound in the environment. The displayed time varying image can comprise images interpretable as flowing water for example, or leaves moving in a gentle breeze. As described below, the time varying image need not reproduce an image with high definition, but rather can comprise a diffused image in which variations in intensity and color evoke 3D effects for a viewer. The display in some embodiments can play a pattern that provides ambient lighting, rather than time varying images that suggest interpretable images. Examples of 3D displays which can be used as display 122, in the illustrated example, are described below with reference to FIGS. 2, 10 and 14 that comprise non-planar diffuser surfaces on which the diffused time varying image can be generated. The video player 124 and the computer system 120 can include a controller implemented using software, for example, which can control the display and control the adjustable offset of the diffuser panel in some embodiments described herein. Controlling the adjustable offset in coordination with the image data can be used to create visual effects on the display which add to the user experience in unique and creative ways.

The system includes a wall mounted display 121 in this embodiment which plays video content provided by a video player 123, which is in turn coupled to the computer system 120. The display 121 can comprise a light source, such as an LED array, having a diffuser panel with an adjustable offset from the light source of the display, as discussed above in connection with the ceiling mounted display 122.

The source of image data, and of control signals for the adjustable diffuser in some example systems, can be an on-premises server (computer system 120), a cloud-based server accessed via the internet, or other source. There may be a plurality of ceiling mounted 3D displays coupled via an amplifier on line 125 to the video player 124. A controller for the 3D display is coupled to a source of image data that causes generation of an interpretable time varying image suggestive of a natural source of the sound in some embodiments.

In this example, a distraction sensor 140 is coupled via an amplifier on line 139 to the computer system 120, the output of which can be utilized by the soundscape server programs to adjust and change the soundscape audio track and video content being executed at any particular time.

A soundscape as illustrated in FIG. 1 can transform an open office into an intelligent, multi-sensory experience that facilitates teamwork and enables workers to maintain focus. Natural sounds and images suggestive of sources of the sounds can be used that dynamically adjust to changing noise levels and integrate with complementary visible elements that satisfy an innate human desire to feel close to nature while relieving stress and rejuvenating the senses.

Figure 2:
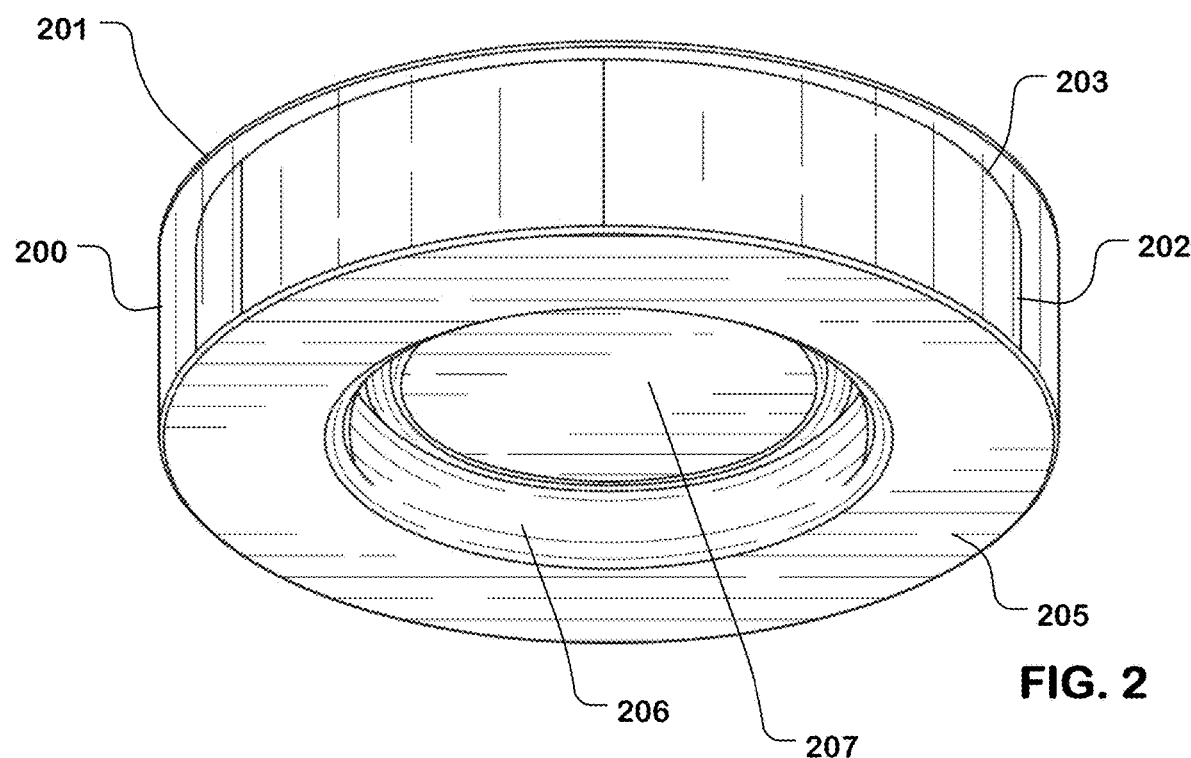
FIG. 2 is a perspective view of a "halo" shaped 3D display comprising an LED array with a non-planar diffuser panel having directly-lit laterally facing surfaces.

FIG. 2 is a perspective drawing of a 3D display having a "halo" shape. Changes in aspect ratio of this form can be implemented, including extending its height to a "barber pole" like shape. See FIG. 14 for example.

The 3D display includes a transmissive diffuser panel 201 (shown as clear in the figure for the purposes of showing its relationship to the underlying structure), which is mounted with an LED array 203. The LED array 203 is arranged on a cylindrical form. The LED array has a surface 202 and emits light in a radial pattern to directly light a back surface of the transmissive diffuser panel 201. The transmissive diffuser panel 201 has a cylindrical diffuser panel surface that is directly lit by the LED array. Other light sources can be utilized as well, including florescent lights, incandescent-type lights and other electroluminescent lights. Also, in embodiments using an LED array, the array can be configured in many ways, in addition to a flexible or rigid single face form factor. An LED array can be configured on a rigid multi-sided unit, in hanging strands of LEDs, and in other configurations.

The 3D display shown in FIG. 2 is configured as a ceiling mounted fixture, and includes a decorative cover 205 on the lower surface, having a "washer" shape, with a recessed region 207 coupled by a curved transition element 206 to provide an enclosed structure for components of the 3D display. The time varying image data is formed by direct lighting of the non-planar, laterally facing diffuser panel surface 200 by the LED pixels.

Figure 3A:
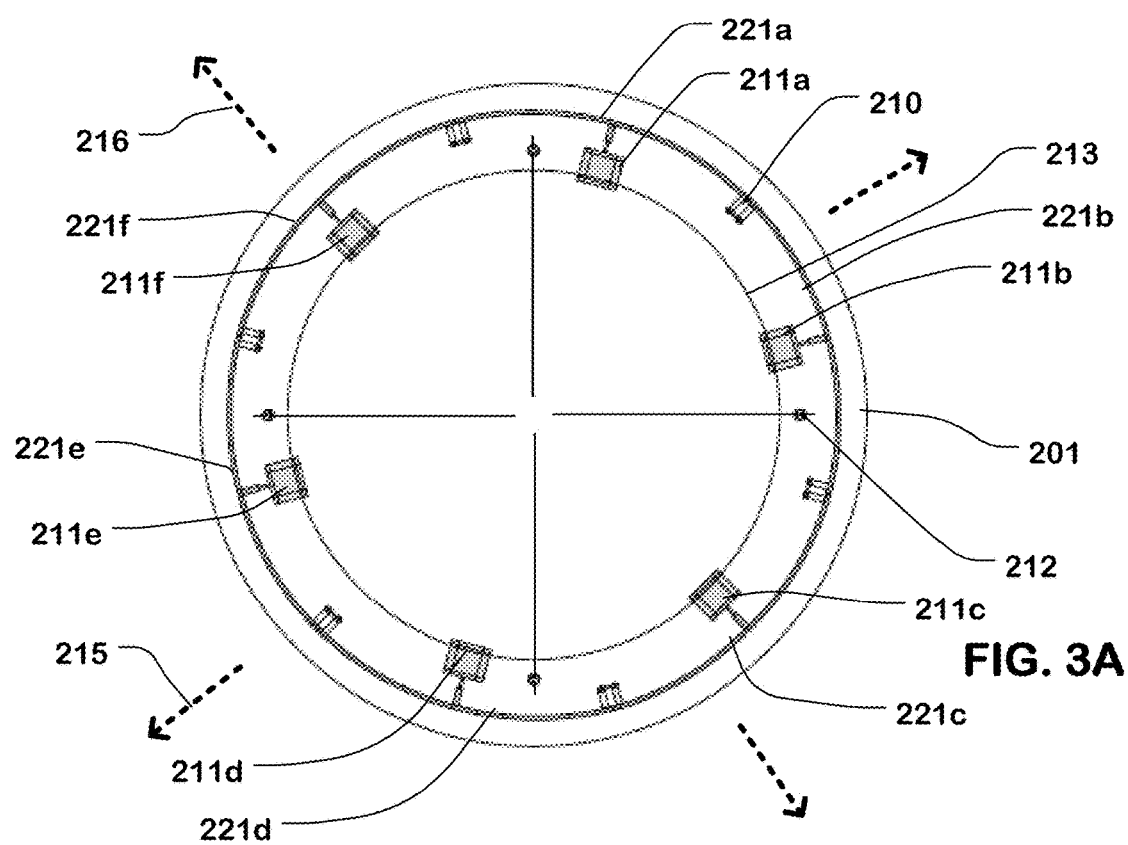
FIGS. 3A and 3B are cross-sectional views of components of a 3D display like that of FIG. 2, showing adjustable distances between the light source and the diffuser panel.
Figure 3B:
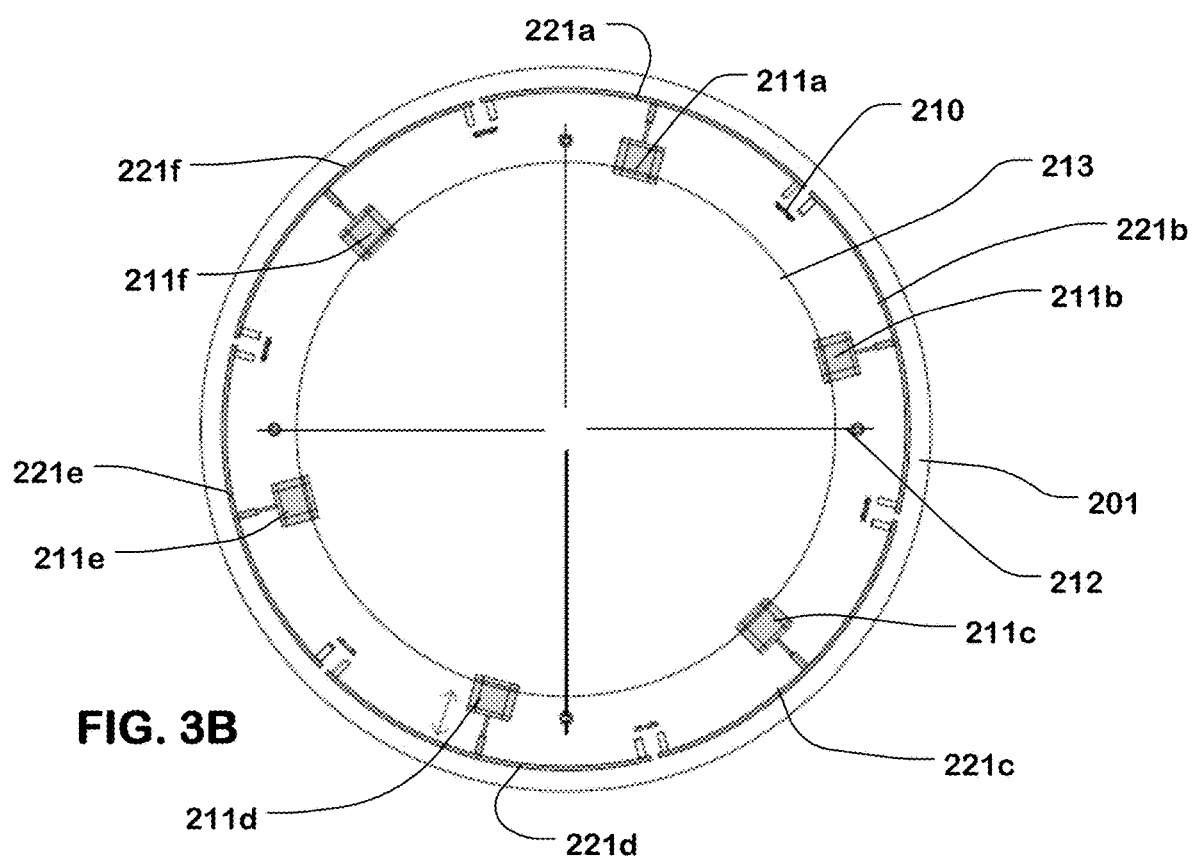

FIGS. 3A and 3B are cross-section views of one embodiment of a 3D display like that of FIG. 2, showing an adjustable support member connected to the frame, which secures the diffuser panel in position relative to the light source, so that a region on the diffuser panel surface is spaced away from the light source by an adjustable distance D. In the example of FIG. 3A, the transmissive diffuser panel 201 has a circular cross-section. It is spaced away from the LED array disposed on a cylindrical form, and comprises curved LED panels 221a to 221f (six in this example) connected to form a cylinder by fittings (e.g. 210) between the segments. The curved LED panels 221a to 221f are mounted on a base cylinder form 213 by stepper motors 211a to 211f with stanchions or other coupling elements. The stepper motors are connected to a controller using corded or wireless communication links (not shown). The stepper motors are controlled to set adjustable distances between the LED panels 221a to 221f, and corresponding directly-lit regions on the diffuser panel 201.

Support pins 212 are arrayed around the base cylinder form for connection to cables or posts to support ceiling mounting of the fixture. When mounted as a ceiling fixture, the cylindrical form of the LED array will have an axis orthogonal to a plane, which plane is referred to herein as a plane of the ceiling. Thus, in embodiments in which the fixture is mounted on a non-planar ceiling or a ceiling which is not orthogonal to a floor, the plane of the ceiling for the purposes of this description is defined by the axis of the cylindrical form of the LED array, as the actual orientation relative to the ceiling and the floor may vary depending on a variety of architectural and aesthetic parameters.

A time varying image can be produced on a non-planar diffuser panel surface spaced away from and concentric with the cylindrical form of the LED array. This allows production of a diffused image having radial viewing directions (e.g. 215, 216), which face laterally relative to a plane of a ceiling on which this fixture is mounted.

FIG. 3B illustrates the structure of FIG. 3A after having operated the stepper motors 211a to 211f to adjust the offset distance between the LED panels 221a to 221f and the corresponding regions on the directly-lit surface of the diffuser panel 201. As illustrated, the stanchions coupled to the stepper motors are extended by operation of the stepper motors, and the adjustable distances between the LED panels and corresponding regions on the directly-lit diffuser surface of the diffuser panel are reduced. As the panels 221a to 221f are moved outwardly, a gap at the position of the fittings 210 between the segments is created, in this example. The fittings 210 include a guide structure or support structure to hold the panels in place during the adjustment. The range of adjustment might be limited in order to minimize the size of the gaps formed. In other embodiments, a designer may desire to allow large gaps to be created between the light sources for the purposes of various visual effects.

The adjustable distance between the light source and the directly-lit diffuser panel can be selected for desired visual effects, including effects which obscure bright light referred to as twinkles, from individual LEDs in the LED panels, and effects which allow twinkle at various intensities to shine through the diffuser panel from individual LEDs in the LED panels.

In this example, the adjustments are equal, so that the distances are uniform around the circumference of the display. In other embodiments, the adjustments can cause different distances in different regions of the diffuser panel. Also, in some embodiments, the adjustments are static, and kept constant while playing a time varying image. In other embodiments, the adjustments can be time varying in coordination with the time varying image or otherwise in order to cause visual effects on the display as desired by the designer.

Figure 4:
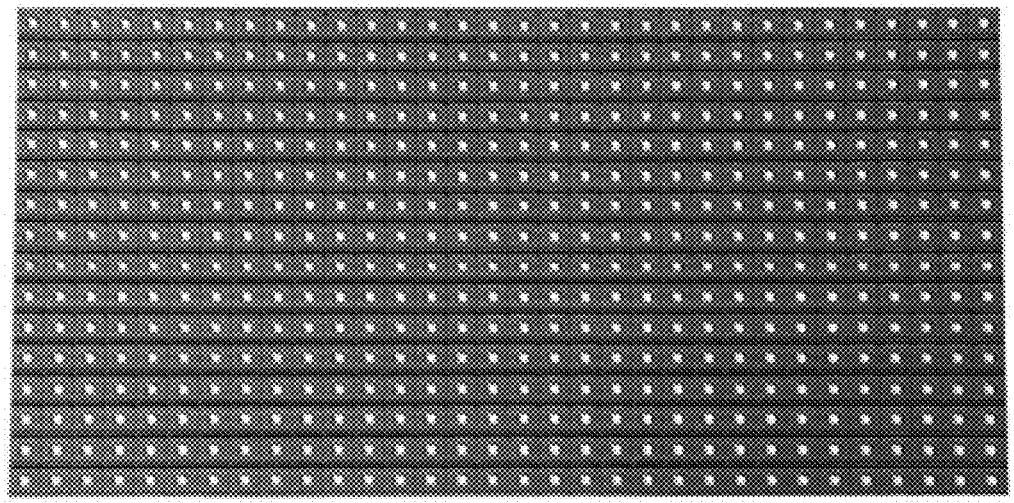
FIG. 4 is an image of an LED module including an array of LED pixels suitable for use in displays as described herein.

FIG. 4 is an image of an LED module 250 showing an array of LED pixels (white spots) on a background panel. The panel can be configured on a cylindrical form, or a planar form. Representative LED modules are commercially available with display driver circuitry and power supplies. Suitable LED modules are available from, among others, Shenzen Unit LED Co. Ltd., 3 Building, Sanlian Industrial Park, Shiyan, Baoan, Shenzhen, China, and LedControlCard.com.

As can be seen, the LED modules arrange LED pixels in an array having a horizontal pitch and a vertical pitch (pixel pitches), which are equal in the illustrated example. For representative embodiments, the horizontal and vertical pitches can be 8 to 10 mm, although a wide range of pitches are available and can be adopted for particular implementations.

Each LED pixel can comprise colored LEDs. In a representative system, each LED pixel includes red, green and blue LEDs, and can be used to generate colored light in the RGB color space. A representative LED module can be operated with a brightness of greater than 1200 cd/m$^2$ (candela per meter squared), although in the production of time varying images maximum brightness may not be utilized.

The LED pixels in the LED modules emit light with relatively broad viewing angles, where a viewing angle is defined as the angle relative to a surface normal to the LED at which light intensity is 50% of its maximum value. The viewing angle can be different in horizontal and vertical directions in some embodiments. In representative embodiments, LED pixels having a viewing angle of 50° to 80° might be utilized.

LED modules such as that shown in FIG. 4 are typically used for producing images for viewing at very long ranges. At close ranges, the individual LED pixels are distinguishable by the viewer.

As described herein, the diffuser panel is disposed over the LED array so that it is directly lit by the LED pixels in the array. Also, the diffuser panel is spaced away from the LED array by an adjustable distance D, where D can be tuned so that it is sufficient to diffuse the light emitted by the LED array to a position at which the individual LED pixels are not distinguishable by a viewer (no twinkle perceptible by a viewer of the display from individual LED pixels), or otherwise do not detract from the image being produced. The diffuser panel however must be close enough to the LED array so that the direct light on any given point on the panel does not include contributions from so many LED pixels as to wash out definition of an image represented by the image data. Thus, the spacing must be close enough that the diffused image produced by the direct lighting can be interpreted by the viewer. For example, a diffused image can be produced that is suggestive of a source of sound in a soundscape environment as discussed above. Also, the adjustable distance D can be set to allow a selected intensity of twinkle in some embodiments.

Figure 5:
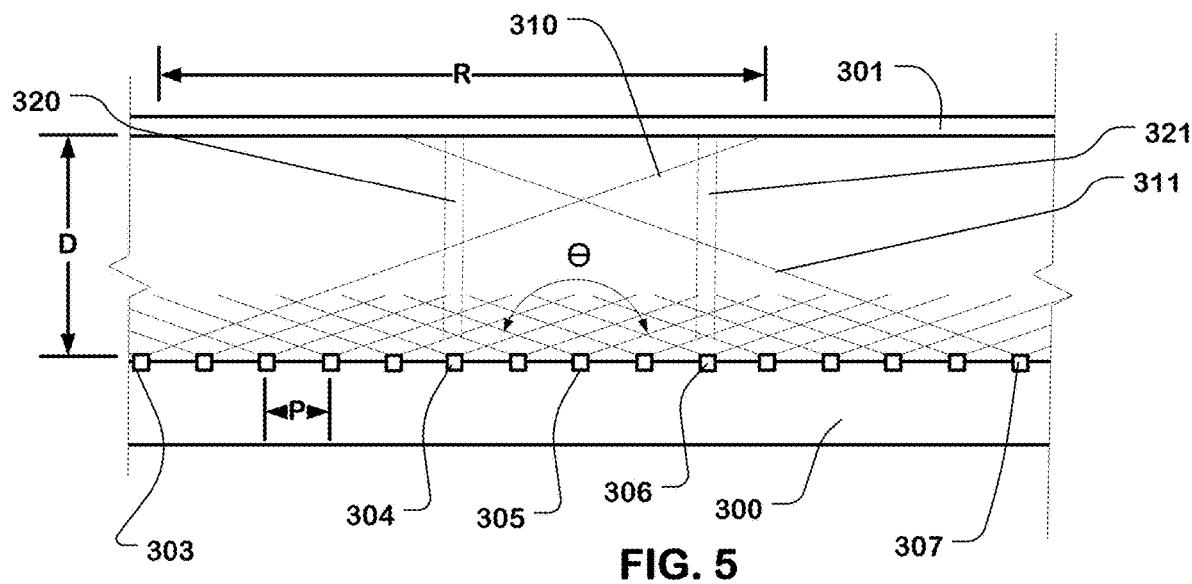
FIG. 5 illustrates spacing relationships among components of embodiments of 3D displays as described herein.

FIG. 5 illustrates a section of an LED module and a diffuser panel, illustrating the distance D between the LED array and the diffuser panel, and its relationship to the pixel pitch and viewing angles of the LED pixels. In FIG. 5, an LED module 300 includes an array of LED pixels (e.g., 303, 304, 305, 306, 307) spaced away by a distance D along a surface normal vector of the LED module 300, from a diffuser panel surface of a diffuser panel 301. The diffuser panel surface is configured to be directly lit by the LED module 300.

In FIG. 5, the module 300 is illustrated as a planar module in order to simplify the figure for the purposes of the description. To support a 3D display like that of FIGS. 2 and 3A/3B, the module 300 and the diffuser panel 301 will have a curvature. In both planar LED module and curved LED module embodiments, the distance D can be uniform across at least a majority of the LED array which illuminates the directly-lit diffuser panel surface. Alternatively, the distance D can vary for different regions of the panel surface.

The LED pixels on the module 300 are arranged in an array having a pixel pitch P, where the pixel pitch is the spacing from the center of one LED pixel to the center of its adjacent LED pixel along one of the X and Y axes of the array.

In FIG. 5, divergence of the light emitted by the LED pixels is illustrated by ray trace lines (e.g. 310, 311). Only the ray trace lines 310 and 311 are drawn all the way from the corresponding LED pixel 303, 307, to the directly-lit diffuser panel surface of the diffuser panel 301 in order to reduce crowding in the figure. At LED pixel 305, it can be seen that the ray trace lines diverge by an angle Θ (symmetrical about the surface normal for the pixel 305 in this example). The angle Θ is two times the viewing angle of the corresponding LED pixel for the purposes of this description, where the viewing angle is defined as the angle where the measured light intensity is 50% of its maximum value. For a representative embodiment, with a viewing angle of about 70°, the angle Θ is about 140°.

As illustrated, the pixel 303 has a right side ray trace 310 which intersects the directly-lit diffuser panel surface at a position that is to the right of pixel 303. Likewise, the LED pixel 307 has a left side ray trace 311 which intersects the directly-lit diffuser panel surface at a position to the left of pixel 304.

A zone of illumination around a particular LED pixel has an area which is a function of its viewing angle Θ/2 and the distance D. Assuming that the zone of illumination is circular, the zone of illumination will have a radius R equal to about D*tan(Θ/2) for a flat directly-lit diffuser panel surface. For a curved directly-lit diffuser panel surface, the radius R of the zone of illumination will project on the directly-lit diffuser surface, making a slightly different radius on the curved surface.

For a pixel pitch P of about 10 mm with a flat LED module, it is found that the distance D in a representative embodiment must be about 27 mm plus or minus about 10% in order to maintain an interpretable image with a diffuser panel comprising a textured polycarbonate sheet 0.125 inches thick, while substantially eliminating perceptible twinkle from individual LED pixels in the array, where twinkle is defined as areas of intensity on the diffuser panel that are recognizable by a viewer as emission from a particular LED.

It can be seen in FIG. 5 that a region on the diffuser panel surface immediately above an individual LED, such as the regions 320, 321 for the LED pixels 304 and 306, falls within the zone of illumination defined by the viewing angles of many pixels. For example, with a pixel pitch of about 10 mm and a distance D of about 27 mm, with a viewing angle Θ/2 of 70°, the radius R of the zone of illumination is about 27 tan(70°) or 74.2 mm. Thus, a region such as region 320, will be illuminated by LED pixels that are disposed in the LED array within a zone of illumination, assuming a circular zone, having an area ($\pi R^2$) of over 17,000 $mm^2$.

For a pixel pitch of about 8 mm with a curved LED module, such as shown in FIG. 3 where the outside radius of the cylindrical form of the LED module is 11.25 inches, it is found that the distance D must be about 38 mm±10% in order to maintain an interpretable image with a diffuser panel comprising a matte polycarbonate film 0.020 inches thick, while substantially eliminating the twinkle from individual LED pixels in the array.

The distance D can be determined experimentally for a given environment in which the 3D display is to be deployed, and for particular implementations of the LED module and diffuser panel. It is found that the distance D should fall within a range that is relatively narrow in order to maintain the quality of having an interpretable image without twinkle or with controllable amounts of twinkle from individual LED pixels. In some embodiments, an effective distance D is between two times and five times the LED pixel pitch. In some embodiments, an effective distance D is selected so that D*tan(Θ/2) is greater than five times the LED pixel pitch on at least one axis of the LED array. In some embodiments, the distance D is tuned so that time varying image regions of contrasting intensity produce a three dimensional 3D image effect.

Transmissive diffuser panels used in 3D displays as described herein can comprise a variety materials. The materials are chosen to diffuse the illumination from the LED array so that the individual LED pixels blur and blend to make an interpretable viewing experience. Representative materials can include acrylic sheets, polycarbonate sheets, polycarbonate films which have sanded or textured surfaces, impregnated with light diffusing additives, or both textured and combined with light diffusing additives. Diffuser panel materials can be cut, formed and molded into complex shapes, including cylindrical shapes as described herein. Diffuse panel materials are available commercially from a variety of sources, including Covestro AG, Kaiser-Wilhelm-Allee 60, 51373 Leverkusen, Germany; Excelite, 908RuiQi Building 668#, Fengting Street S Suzhou, China; and Curbell Plastics, Inc., 7 Cobham Drive, Orchard Park, N.Y.

According to embodiments of a 3D display as described herein, the pixel pitch of the LED pixels, the distance D between the LED module and the directly-lit surface of the diffuser panel, and the viewing angle, in combination, are effective to merge illumination for multiple LED pixels in the LED array on the directly-lit diffuser panel surface, and can be tuned to achieve the interpretable, 3D image effects described herein.

Figure 6:
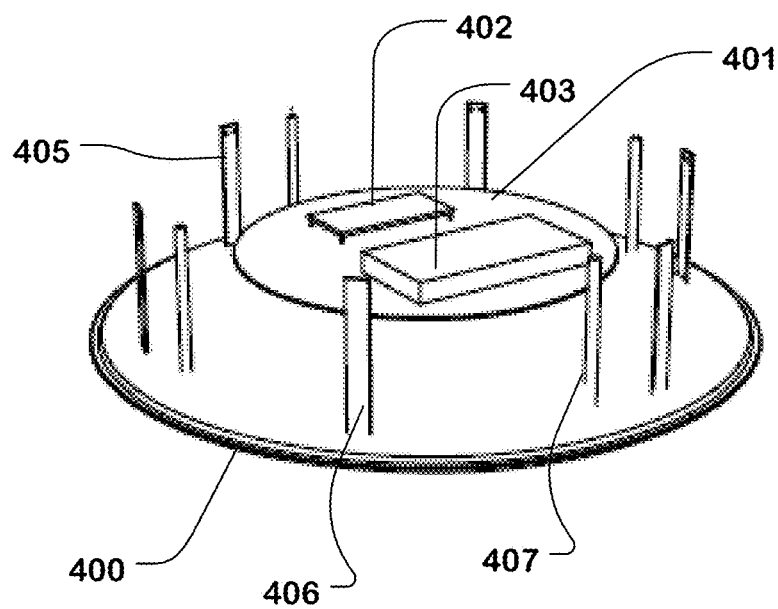
FIGS. 6-9 illustrate subassemblies at stages of manufacturing of a 3D display like that of FIG. 2.

FIGS. 6-9 illustrate assembly of a 3D display like that of FIG. 2. In FIG. 6, a subassembly is illustrated including a base panel 400 on which a plurality of stanchions (e.g. 405, 406, 407) are disposed. An electronics board 401 is mounted on the base panel 400. Electronic components including a controller card 402 and a power supply 403 are mounted on the electronics board. The controller card 402 is coupled to a source of image data as discussed above, by corded or wireless connections as suits a particular implementation. The controller card 402 includes a controller connected after completion of the assembly to the LED array, and in some embodiments to motors for control of the adjustable support member as discussed above. The controller card 402 comprises circuitry to control the LED array in response to image data. As a result, the controller induces display via the diffuser panel of a time varying image with spatially varying colors and intensities.

Figure 7:
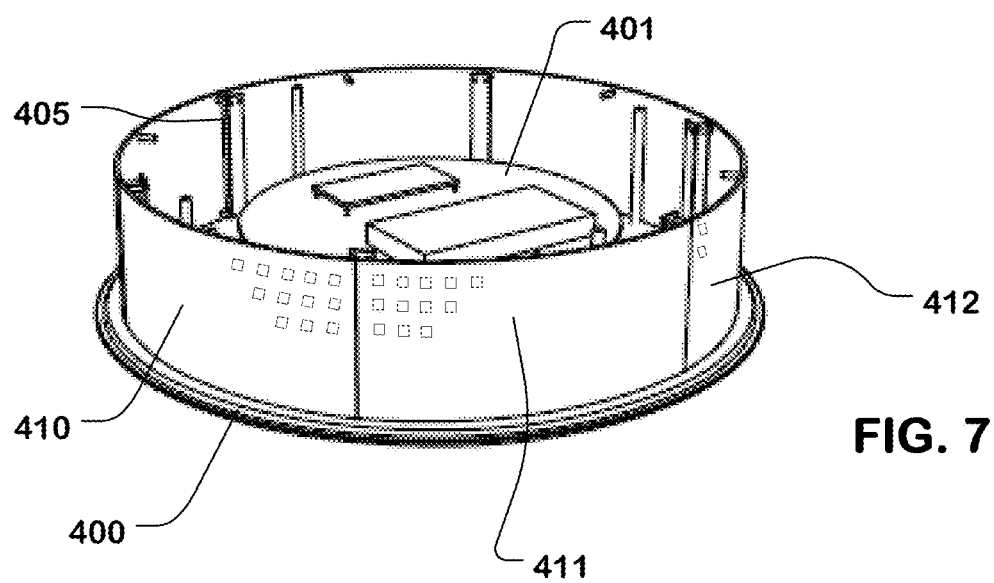

FIG. 7 illustrates a subassembly after addition of six curved LED modules (e.g. 410, 411, 412). The LED modules are coupled to corresponding stanchions on the base 400, to form an LED array arranged on a cylindrical form. Electronic connections (not shown) are made between the electronics on the electronics board 401 and the individual panels.

Figure 8:
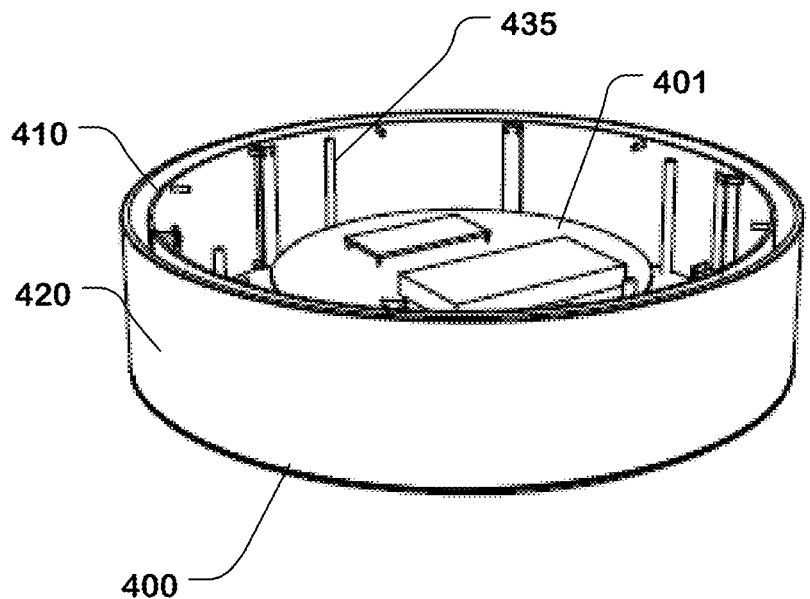

FIG. 8 illustrates a subassembly after addition of a cylindrical diffuser panel 420 on the base 400. As can be seen, the diffuser panel 420 is disposed concentrically with the cylindrical form of the LED array, and spaced away from the LED modules (e.g. 410) of the cylindrical LED array by the distance D as described above. Posts (e.g. 435) are connected to the base 400, in order to configure the fixture for ceiling mount. In an alternative, the fixture can be configured for use as a wall mount fixture.

Figure 9:
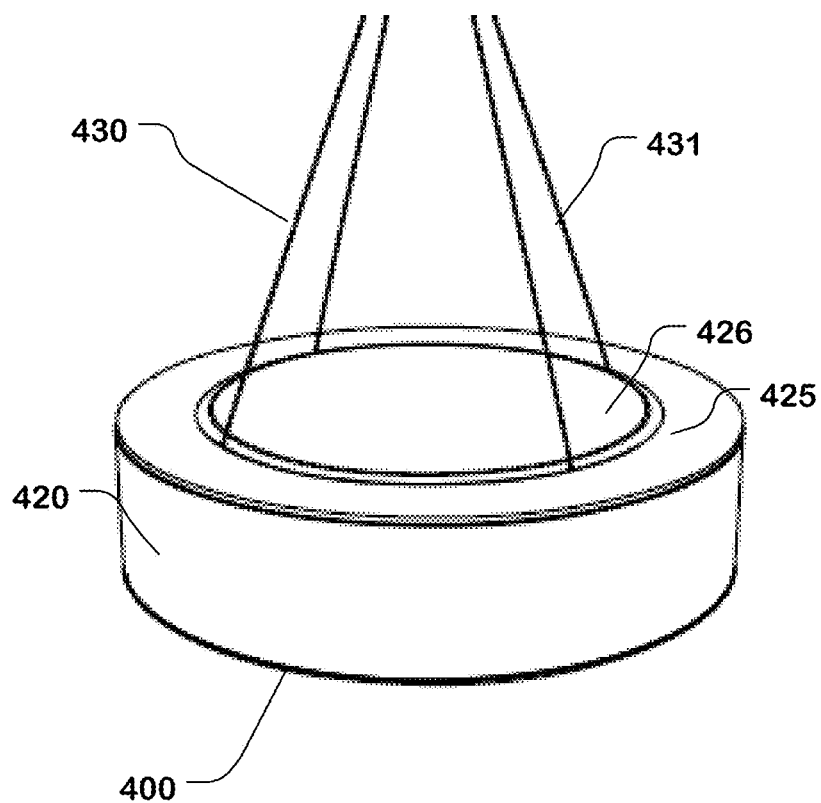

FIG. 9 illustrates the completed assembly after addition of cover panels 425 and 426. Cables or posts 430, 431 are coupled to the posts (e.g. 410) and used for mounting the fixture on a ceiling. The transmissive diffuser panel 420 includes a directly-lit surface that is nonplanar, and is viewable from directions laterally relative to the plane of the ceiling.

The assembly of FIG. 9 is a display apparatus, comprising a ceiling mount fixture for mounting relative to a plane of a ceiling. It includes an LED array mounted on a cylindrical form on the ceiling mount fixture, the cylindrical form having an axis orthogonal to the plane of the ceiling. A transmissive diffuser panel is mounted with the LED array, having a directly-lit, cylindrical diffuser panel surface, concentric with the cylindrical form, and spaced away from the LED array and facing laterally relative to the plane of the ceiling. A controller connected to the LED array is included, which controls the LED array in response to image data to induce display via the diffuser panel of a time varying image with spatially varying colors and intensities.

Figure 10:
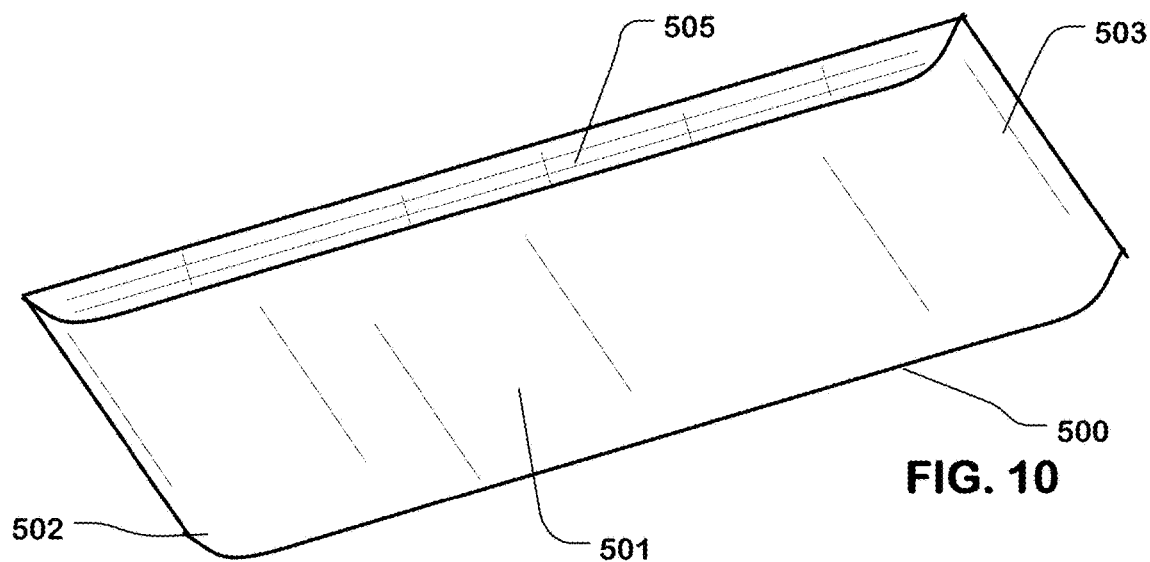
FIG. 10 is a perspective view of a flat 3D display with upwardly curving edges including technology as described herein.

FIG. 10 is a perspective view of a 3D display having a flat shape with laterally curved sides, illustrating an alternative embodiment of a 3D display on a ceiling mount fixture. In this embodiment, the diffuser panel has a surface 501 which is substantially planar over a major portion of its illuminated area. The diffuser panel (500) surface is straight along a line, and curves upwardly towards the plane of the ceiling, when considered as a ceiling mounted fixture. The side panel 505 can obscure an LED array mounted inside the fixture. The diffuser panel includes perimeter regions 502, 503, which are directly lit by the underlying LED array, but face laterally relative to the plane of the ceiling. In an alternative, the fixture can be configured as a wall mount fixture.

Figure 11:
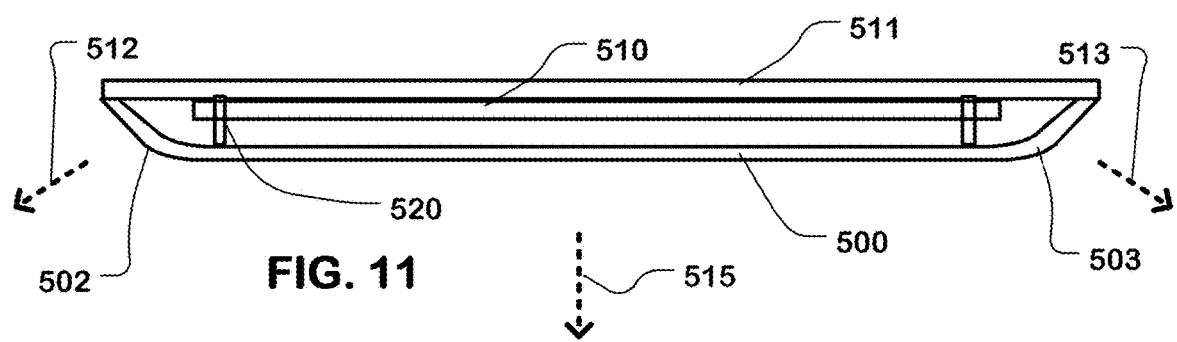
FIG. 11 is a cross-sectional view of a 3D display like that of FIG. 10.

FIG. 11 illustrates a cross-section of a 3D display like that of FIG. 10. As can be seen, the LED array 510 is disposed on a flat or planar form 511. The diffuser panel 500 includes laterally facing perimeter regions 502 and 503. The diffuser panel 500 is spaced away from the LED array 510 by at least one adjustable post (e.g. 520) in this example, which can be small enough and few enough as so as to not cause distracting shadows on the directly-lit surface of the diffuser panel 500. The adjustable posts can establish equal or varying offsets for different regions of the diffuser panel from the light sources as suits a particular implementation.

In the illustrated example, the LED array 510 is disposed in an array of modules so that the LED pixels are spaced away from the directly-lit surface of the diffuser panel 500 by the distance D, over at least a major region parallel to the planar mount portion of the diffuser panel 500. LED pixels near the edges of the LED array illuminate the curved perimeter regions 502 and 503 of the diffuser panel to a degree effective to enhance a three-dimensional effect of the time varying image. An image created on the directly-lit surface of the diffuser panel 500 is viewable both vertically (on arrow 515) and laterally (on arrows 512, 513).

Figure 12:
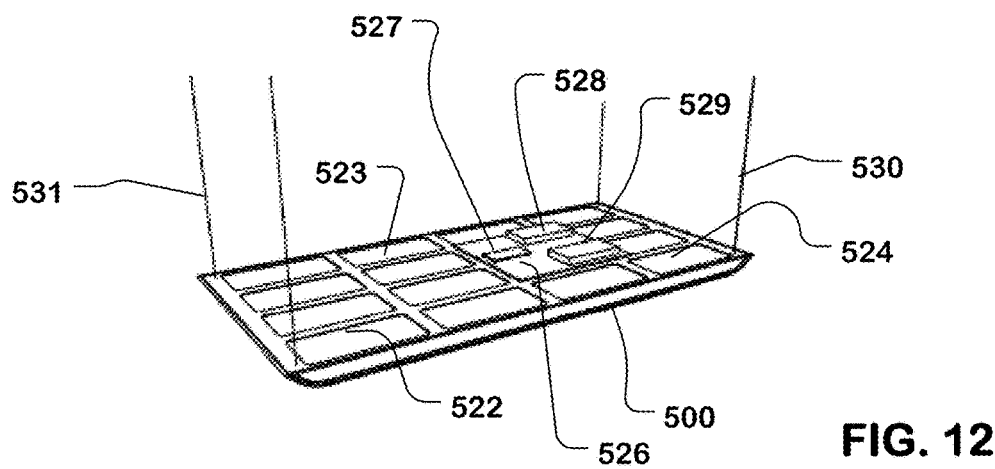
FIGS. 12-13 illustrate subassemblies at stages of manufacturing of a 3D display like that of FIG. 10.
Figure 13:
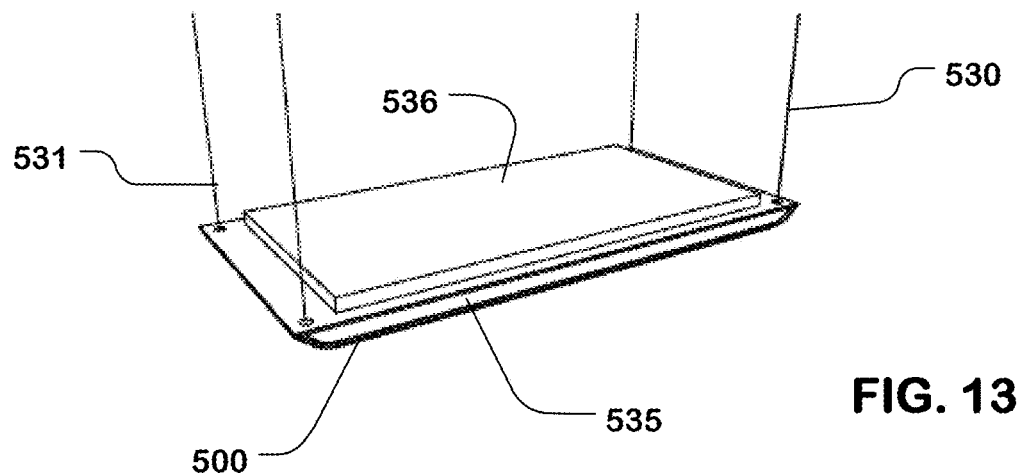

FIGS. 12 and 13 illustrate subassemblies of a flat 3D display like that of FIG. 10 configured as a ceiling mounted fixture. In FIG. 12, the diffuser panel 500 is coupled to a set of LED modules (e.g. 522, 523, 524) that are coupled to a planar form, and provide LED pixels facing the inside surface of the diffuser panel 500. An electronics board 526 is mounted on the set of modules, and includes a controller card 527 and one or more power supplies 528, 529. The controller card 527 includes a controller having circuitry to drive the LED modules, and optionally motors for the adjustable support member, as discussed above with respect to the embodiment of FIGS. 6-9.

A plurality of posts, or cables, (e.g. 530, 531) are connected to the base to provide for mounting the fixture on a ceiling.

FIG. 13 shows the fixture configured for ceiling mount, with a backplate cover 536, and side panel 535.

The assembly of FIG. 13 is a display apparatus, comprising a ceiling mount fixture. An LED array is mounted on a planar form on the ceiling mount fixture, the planar form parallel to the plane of the ceiling. A transmissive diffuser panel is mounted with the LED array, having a directly-lit diffuser panel surface spaced away from the LED array, the directly-lit diffuser panel surface having a major region parallel to the planar form and curved perimeter regions facing laterally relative to the plane of the LED array (which can be parallel to a plane of the ceiling). A controller is connected to the LED array which controls the LED array in response to image data to induce display via the diffuser panel of a time varying image with spatially varying colors and intensities.

Figure 14:
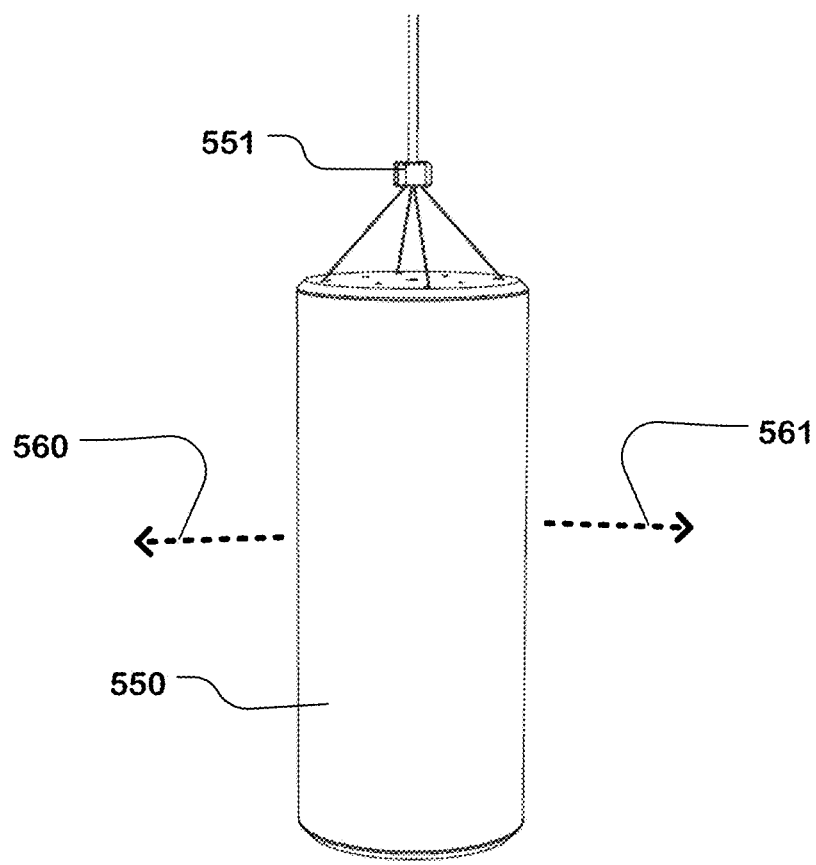
FIG. 14 is a perspective view of a 3D display including an elongated cylinder shaped viewing area.

FIG. 14 is a perspective drawing of a 3D display with a cylindrical transmissive diffuser panel 550, directly lit by an LED array to produce images that are viewable laterally. It can be assembled as discussed above in connection with the embodiment of FIGS. 6-9. An LED array (not shown) is disposed within the diffuser panel 550, and spaced away by an adjustable distance D to enable production of time varying, diffused images as discussed above, which are interpretable, and can be made with or without perceptible twinkle. The 3D display of FIG. 14 is configured as a ceiling mounted fixture having mounting structure 551, and providing for lateral viewing from directions 560, 561. The radius of the cylindrical diffuser panel 550 can be about 4 to 6 inches for example, and the vertical height can be 16 to 20 inches for example. Of course, other dimensions are possible as suits a particular installation.

Figure 15:
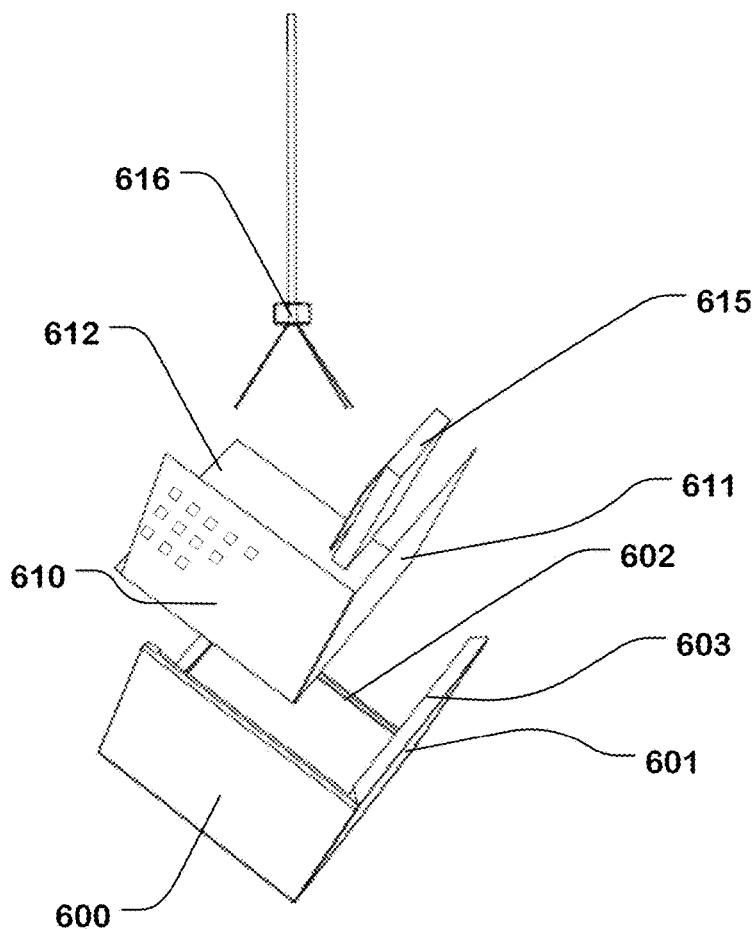
FIG. 15 is an exploded view of a 3D display comprising a plurality of flat segments of a diffuser panel having laterally facing surfaces, including technology described herein.
Figure 16:
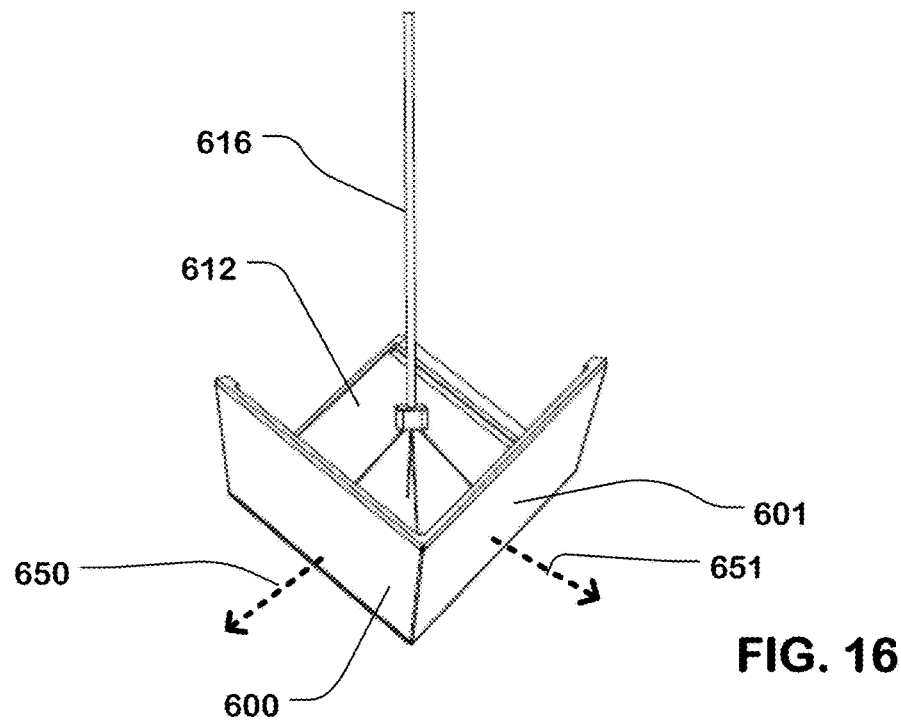
FIG. 16 is a perspective view of the 3D display of FIG. 15.

FIG. 15 and FIG. 16 are an exploded view and a perspective view of yet another embodiment of a 3D display. Referring to FIG. 15, a diffuser panel comprises a three-sided prism shape having subpanels 600, 601, 602 mounted on a frame 603. An LED array comprises matching panels 610, 611, 612, which is configured to be disposed inside and spaced away from the diffuser subpanels (600, 601, 602) by adjustable distances, and to directly light the diffuser subpanels as discussed above. An electronics board 615 is mounted on the LED panels, housing a controller card and a power supply for example. A ceiling mount 616 comprising a set of cables is attached to the structure, and configured for ceiling mounting of the fixture.

A perspective view of the three sided prism embodiment is shown in FIG. 16. The diffuser panel includes laterally facing subpanels (e.g. 600 and 601). The LED panel 612 is secured to the diffuser panels. The ceiling mount 616 is secured to the structure. As a result, lateral viewing from directions 650, 651 can be provided.

The fixture of FIG. 16 includes a plurality of panels arranged to face in different directions, and the directly-lit, non-planar diffuser panel surface includes a plurality of regions, one or more of which can be spaced away by adjustable distances from corresponding panels in the plurality of panels.

It will be appreciated that a variety of three-dimensional shapes can be utilized to provide for lateral viewing of a 3D display based on directly-lit diffuser panels as described herein.

FIGS. 17A and 17B provide a simplified illustration of an embodiment of an adjustable support member, set for different offset distances, and suitable for use with a display like that of FIG. 11, and for other configurations of the display. With reference to FIG. 17A, the display comprises a frame 700. A light source 701 such as an LED array is mounted on the frame 700. The adjustable support member secures a diffuser panel 702 in position relative to the light source 701. The diffuser panel includes a region 703 which provides for lateral viewing as discussed above. In this illustration, only a portion of the diffuser panel 702 is illustrated. The diffuser panel 702 may include a plurality of regions, with separate adjustable support members as discussed above.

The adjustable support member in this example comprises a threaded coupler 706 having a first portion secured to the frame 700 and a second portion secured to the diffuser panel 702. In this example, a motor 705, such as a stepper motor, shaft is connected to the threaded coupler 706. Likewise, a threaded shaft is coupled to the diffuser panel 702. Rotation of the threaded coupler 706 causes the coupler to extend as illustrated in FIG. 17B. The motor can be controlled using a controller that can comprise a computer program executed on a server, or other type of automatic process which can be responsive to time varying input data, or can comprise a manual control circuit operable for example by a switch.

Although only one adjustable support member is illustrated in FIGS. 17A and 17B, there can be a plurality of adjustable support members coupled to a single diffuser panel 702. In embodiments in which the diffuser panel 702 is flexible, or divided into segments, the adjustable support members can be set at different offset distances and can be controlled independently as suits a particular installation.

FIGS. 18A and 18B provide a simplified illustration of an alternative embodiment of an adjustable support member, set for different offset distances, and suitable for use with a display like that of FIG. 11, and for other configurations of the display. With reference to FIG. 18A, the display comprises a frame 800. A light source 801 such as an LED array is mounted on the frame 800. The adjustable support member secures a diffuser panel 802 in position relative to the light source 801. The diffuser panel includes a region 803 which provides for lateral viewing as discussed above. In this illustration, only a portion of the diffuser panel 802 is illustrated. The diffuser panel 802 may include a plurality of regions, with separate adjustable support members as discussed above.

The adjustable support member in this example comprises a threaded coupler 806 having a first portion secured to the frame 800 (an inner threaded shaft) and a second portion secured to the diffuser panel 802 (an outer threaded coupler). In this example, the threaded support member includes a head 805 connected to the inner threaded shaft, which can be rotated by a user. The head 805 can include a slot or recess adapted to accept a tool 810, like an Allen wrench or screwdriver. Rotation of the threaded coupler 806 using the tool 810 causes the coupler to extend as illustrated in FIG. 18B.

Although only one adjustable support member is illustrated in FIGS. 18A and 18B, there can be a plurality of adjustable support members coupled to a single diffuser panel 802. In embodiments in which the diffuser panel 802 is flexible, or divided into segments, the adjustable support members can be set at different offset distances as suits a particular installation.

Figure 19A:
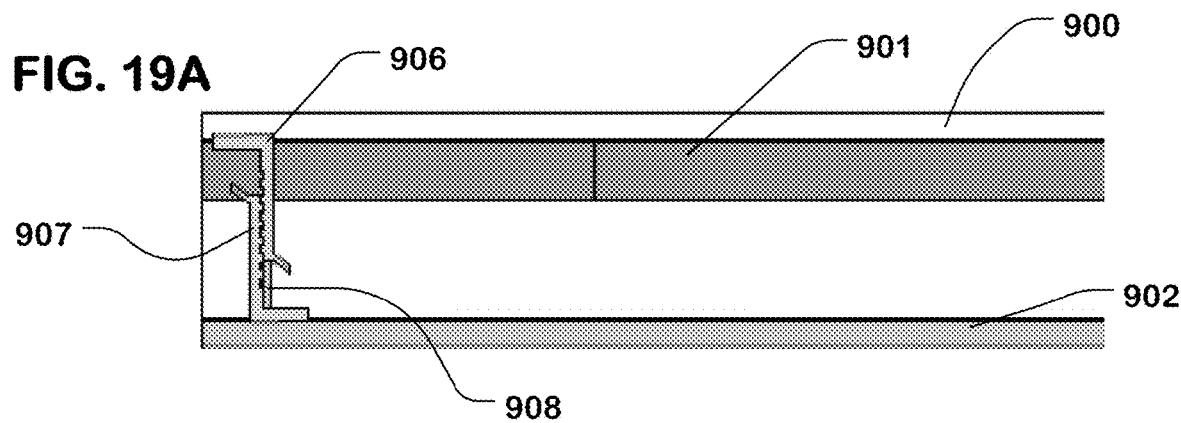
FIGS. 19A to 19C illustrate a third embodiment of an adjustable support member for a display like that shown in FIG. 11.
Figure 19B:
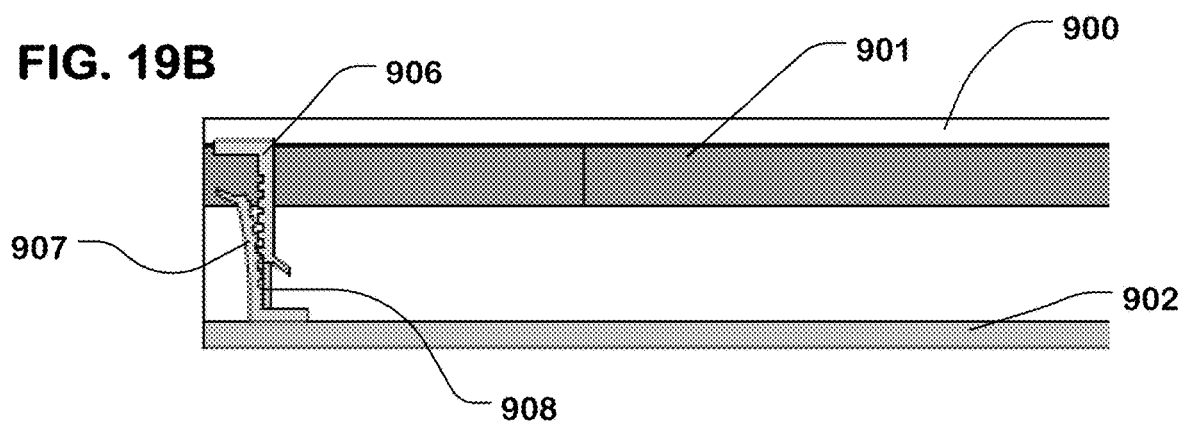
Figure 19C:
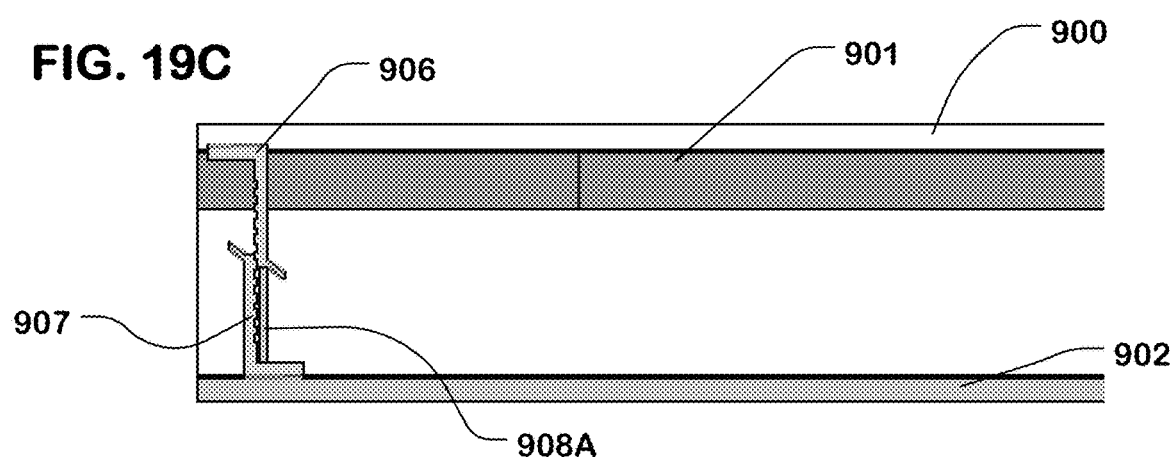

FIGS. 19A to 19C provide a simplified illustration of yet another embodiment of an adjustable support member, suitable for use with a display like that of FIG. 11, and for other configurations of the display. The display comprises a frame 900. A light source 901 such as an LED array is mounted on the frame 900. The adjustable support member secures a diffuser panel 902 in position relative to the light source 901. In this illustration, only a portion of the diffuser panel 902 is illustrated. The diffuser panel 902 may include a plurality of regions, with separate adjustable support members as discussed above.

The adjustable support member in this example comprises manually adjustable, notched tension clips 906, 907 coupled respectively to the frame 900 and the diffuser panel 902, and which can be manually adjusted. In FIG. 19A, the notched tension clips 906, 907 are secured by the tension and the notches at a first offset distance. A captive shaft 908 can be secured between a distal end of the upper notched tension clips 906 and the base of the lower notched tension clips 907 in some embodiments to provide a more secure setting.

As illustrated in FIG. 19B, the notched tension clips can be bent or deformed by the user to enable adjustment of the offset distance. Thus, as illustrated, the lower notched tension clip 907 is bent so that the notches separate from corresponding notches on the upper notched tension clip 906, unlinking the mating teeth.

As illustrated in FIG. 19C, the adjustable support member is set with a different offset distance after the lower notched tension clip is pushed down and locked into a new position. The notched tension clips are secured in contact with one another, and a captive shaft 908A configured for the different offset stops over-travel and the diffuser from falling from the assembly, for safety.

Again, although only one adjustable support member is illustrated in FIGS. 19A-19C, there can be a plurality of adjustable support members coupled to a single diffuser panel 902. In embodiments in which the diffuser panel 902 is flexible, or divided into segments, the adjustable support members can be set at different offset distances as suits a particular installation.

Figure 20:
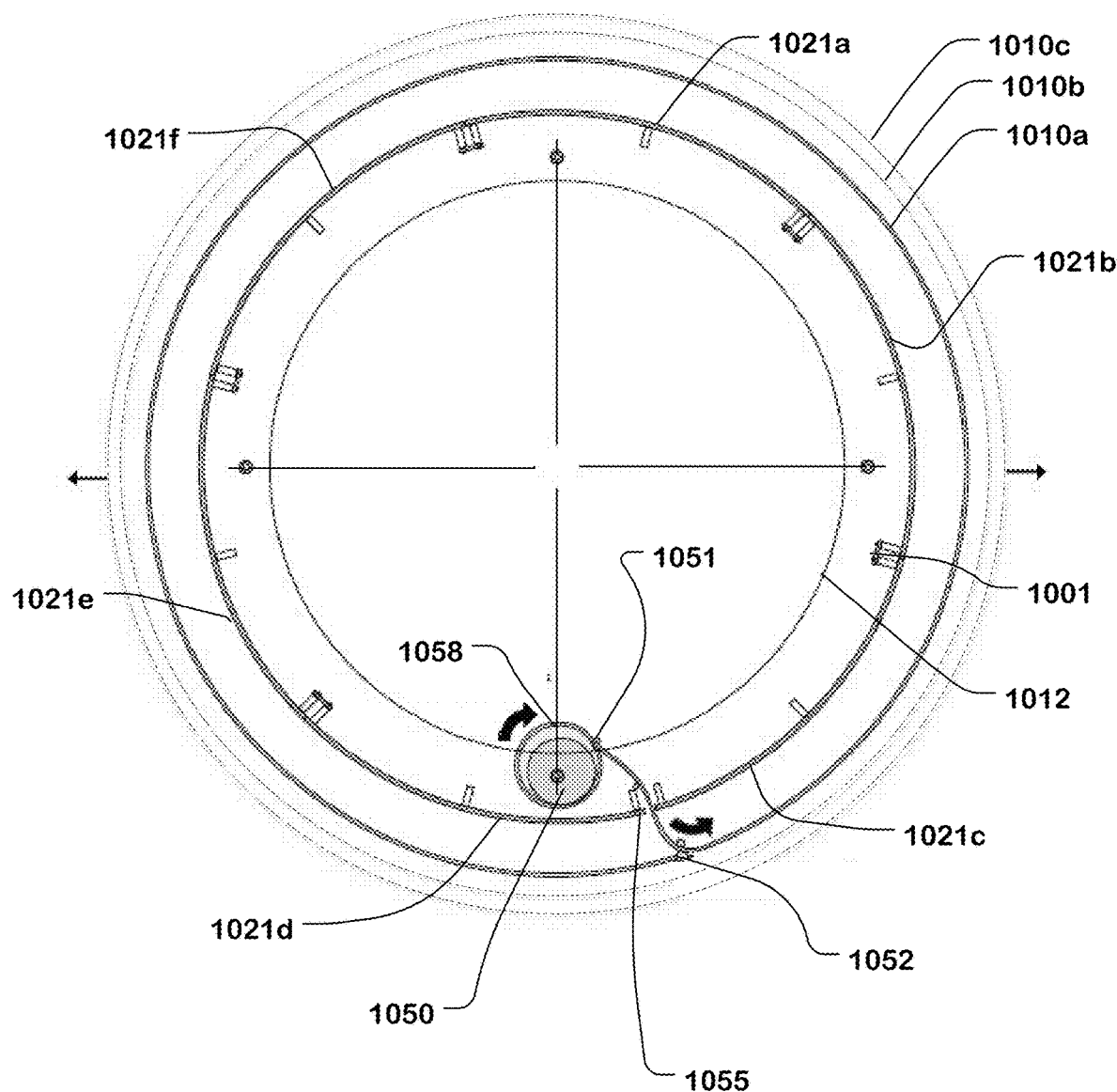
FIG. 20 illustrates an alternative embodiment of an adjustable support member for a display having a cylindrical form like that shown in FIG. 2.

FIG. 20 is a cross-section view of an alternative embodiment of a 3D display like that of FIG. 2, or FIG. 14 for example, showing an adjustable support member based on an expanding diffuser film roll. In this example, the transmissive diffuser panel 1010a has a cylindrical form with a circular, or circle-like, cross-section. It is spaced away from an LED array comprising six segments 1021a to 1021f like those illustrated in FIG. 3A, secured by couplings (e.g. 1001). The segments are connected to form a cylinder by couplings 1001. In this example, the LED array has a fixed position. The curved LED panel segments 1021a to 1021f are mounted on a base frame 1012.

A slot 1055 in the cylindrical form of the LED array is adjacent to a set of guideposts (e.g. 1051, 1052) which admit and guide the diffuser film from an internal roller system 1050. An excess length of diffuser film 1058 is coiled on the internal roller system 1050. By adjusting the length of the diffuser film that extends through the opening, the circumference of the diffuser panel increases, and the offset distance of the diffuser panel from the LED array increases. Thus the diffuser panel can have positions 1010b and 1010c in different settings as illustrated.

The internal roller system 1050 can be driven by a precisely controlled motor, or manually driven, as suits a particular implementation. After changes in the circumference of the diffuser panel, the flexible diffuser film can be secured around the perimeter by fixtures (not shown) to establish the desired offset distances for various regions of the diffuser panel.

An improved display system based on a directly-lit, transmissive diffuser is described, suitable for displaying time varying images such as used in a soundscape system that plays various types of media that can be played on various display systems. Because each type of media puts out a different color spectrum/brightness and contrast level, a diffused image on one display system might not always look ideal and believable on a different display system. Also, different media played on a single display with a fixed spacing/diffusion level may not all look ideal. For example, aspects such as over-lighting an array can show LED pixels peeking through (twinkle) while other visuals may require less diffuser to aid in low light situations.

A technology is provided that enables an ability to adapt to different media streams as well as environments and lighting situations while tuning the effect and strength of the LED "twinkle" (the pixel visibility) and other visual effects.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. An apparatus, comprising:
   a frame;
   a light source on the frame;
   a transmissive diffuser panel having a diffuser panel surface directly lit by the light source; and
   an adjustable support member connected to the frame, which secures the diffuser panel in position relative to the light source, so that a region on the diffuser panel surface is spaced away from the light source by an adjustable distance D.

2. The apparatus of claim 1, including a controller connected to the light source to induce a display in response to image data via the diffuser panel of a time varying image with spatially varying colors and intensities.

3. The apparatus of claim 1, including a controller and a motor coupled to the adjustable support member, configured to adjust the adjustable distance D.

4. The apparatus of claim 1, including
   a motor coupled to the adjustable support member, configured to adjust the adjustable distance D; and
   a controller connected to the light source and the motor to cause the motor to change the distance D over time in response to display control data, and to induce a display via the diffuser panel of a time varying image with spatially varying colors and intensities.

5. The apparatus of claim 1, wherein the light source comprises an LED array.

6. The apparatus of claim 1, wherein the diffuser panel surface includes a plurality of regions, including said first mentioned region, spaced away by adjustable different distances from the light source.

7. The apparatus of claim 1, configured as a ceiling mounted fixture which orients the directly-lit, diffuser panel surface relative to a plane of a ceiling.

8. The apparatus of claim 1, wherein the light source comprises an LED array arranged on a cylindrical form, and the directly-lit, diffuser panel surface is cylindrical.

9. The apparatus of claim 1, wherein the light source comprises an LED array disposed on a planar form.

10. The apparatus of claim 1, wherein the light source comprises an LED array including a plurality of panels arranged to face in different directions, and the diffuser panel surface includes a plurality of regions including said first mentioned region, spaced away by adjustable distances from corresponding panels in the plurality of panels.

11. The apparatus of claim 1, configured for use in a soundscape environment in which a sound is produced in the environment, and including a controller connected to the light source in response to image data to induce display via the diffuser panel of an interpretable time varying image suggestive of a source of the sound.

12. A display apparatus, comprising:
    a mount fixture for mounting;
    a frame;
    an LED array mounted on the mount fixture;
    a transmissive diffuser panel having a diffuser panel surface directly lit by the light source;
    an adjustable support member connected to the fixture, which secures the diffuser panel in position relative to the LED array, so that a region in the diffuser panel surface is spaced away from the LED array by an adjustable distance D; and
    a controller connected to the LED array which controls the LED array in response to image data to induce a display via the diffuser panel of a time varying image with spatially varying colors and intensities.

13. The apparatus of claim 12, wherein the mount fixture comprises a ceiling mount fixture for mounting relative to a plane of a ceiling, and the LED array is disposed on a cylindrical form, and the diffuser panel surface is cylindrical and concentric with the cylindrical form, and faces laterally relative to the plane of the ceiling.

14. The apparatus of claim 12, wherein the mount fixture comprises a ceiling mount fixture for mounting relative to a plane of a ceiling, and the LED array is mounted on a planar form on the ceiling mount fixture, the planar form parallel to the plane of the ceiling.

15. The apparatus of claim 12, including a motor coupled to the adjustable support member, configured to adjust the adjustable distance D.

16. The apparatus of claim 15, wherein the controller is configured to control the motor to change the distance D over time.

17. The apparatus of claim 12, including a plurality of adjustable support members, and wherein the diffuser panel surface includes a plurality of regions, including said first mentioned region, spaced away by adjustable different distances set by the plurality of adjustable support members from the light source.

18. The apparatus of claim 17, wherein the controller is coupled to the adjustable support members and configured to change one or more of the different distances over time.

19. The apparatus of claim 12, configured for use in a soundscape environment in which a sound is produced in the environment, and wherein the controller is coupled to a source of image data that causes generation of an interpretable time varying image suggestive of a source of the sound.

20. The apparatus of claim 12, wherein the mount fixture comprises a wall mount fixture.

* * * * *